United States Patent
Terwillegar et al.

(10) Patent No.: US 10,941,240 B2
(45) Date of Patent: Mar. 9, 2021

(54) BIORENEWABLE HIGH PERFORMANCE POLYESTER POLYOLS

(71) Applicant: PTT Global Chemical Public Company Limited, Bangkok (TH)

(72) Inventors: Arne Matthew Terwillegar, Kernersville, NC (US); Charliss Denniston, Raleigh, NC (US)

(73) Assignee: PTT Global Chemical Public Company Limited, Bangkok (TH)

( * ) Notice: Subject to any disclaimer, the term of this patent is extended or adjusted under 35 U.S.C. 154(b) by 76 days.

(21) Appl. No.: 16/335,930

(22) PCT Filed: Sep. 25, 2017

(86) PCT No.: PCT/US2017/053184
§ 371 (c)(1),
(2) Date: Mar. 22, 2019

(87) PCT Pub. No.: WO2018/058016
PCT Pub. Date: Mar. 29, 2018

(65) Prior Publication Data
US 2019/0309121 A1 Oct. 10, 2019

Related U.S. Application Data

(60) Provisional application No. 62/399,423, filed on Sep. 25, 2016.

(51) Int. Cl.
| | |
|---|---|
| *C08G 18/42* | (2006.01) |
| *C08G 18/28* | (2006.01) |
| *C08G 18/66* | (2006.01) |
| *C08G 18/10* | (2006.01) |
| *C08G 18/34* | (2006.01) |
| *C08G 18/75* | (2006.01) |
| *C08G 18/08* | (2006.01) |
| *C09D 175/06* | (2006.01) |
| *C08G 18/32* | (2006.01) |
| *C08G 18/12* | (2006.01) |

(52) U.S. Cl.
CPC ..... *C08G 18/6659* (2013.01); *C08G 18/0823* (2013.01); *C08G 18/10* (2013.01); *C08G 18/12* (2013.01); *C08G 18/3228* (2013.01); *C08G 18/348* (2013.01); *C08G 18/4216* (2013.01); *C08G 18/4238* (2013.01); *C08G 18/4255* (2013.01); *C08G 18/755* (2013.01); *C09D 175/06* (2013.01)

(58) Field of Classification Search
None
See application file for complete search history.

(56) References Cited

U.S. PATENT DOCUMENTS

| | | |
|---|---|---|
| 2011/0039968 A1 | 2/2011 | Vairo |
| 2012/0116114 A1 | 5/2012 | Nefzger et al. |
| 2012/0123008 A1 | 5/2012 | Nefzger et al. |
| 2015/0031848 A1 | 1/2015 | Honcoop et al. |
| 2015/0344622 A1 | 12/2015 | Mukerjee et al. |
| 2016/0362515 A1* | 12/2016 | Klang .......... C09D 175/12 |
| 2017/0049684 A1* | 2/2017 | Klang .......... C08G 18/6625 |
| 2020/0148817 A1* | 5/2020 | Terwillegar .......... C08G 18/244 |

FOREIGN PATENT DOCUMENTS

| | | | | |
|---|---|---|---|---|
| WO | WO-2015128373 A1 * | 9/2015 | ......... | C08G 18/4825 |
| WO | WO-2015165902 A1 * | 11/2015 | ........... | C08G 18/428 |

* cited by examiner

*Primary Examiner* — Michael J Feely
(74) *Attorney, Agent, or Firm* — Oblon, McClelland, Maier & Neustadt, L.L.P.

(57) ABSTRACT

This invention provides a process for manufacturing high performance polyester polyols with high proportion of renewable content derived from biological sources. The polyester polyols with high content of renewable biological materials produced according to the present invention display no color or odor issues and are used in the manufacture of two component polyurethanes, thermoplastic urethanes, polyurethane dispersions and polyester and polyester/urethane acrylates with outstanding physical properties.

20 Claims, 8 Drawing Sheets

R = HP 210, HP 210 Flex , IPA/AA/HDO or IPA/SAC/HDO

BIORENEWABLE HIGH PERFORMANCE POLYESTER POLYOLS

CROSS-REFERENCE TO RELATED APPLICATION

The application is the U.S. national stage application of International Patent Application No. PCT/US2017/053184 filed on Sep. 25, 2017, which claims the priority of the U.S. Provisional Application Ser. No. 62/399,423 filed on Sep. 25, 2016.

FIELD OF THE INVENTION

The present invention is in the field of manufacturing two component polyurethanes, thermoplastic urethanes, polyurethane dispersions, polyester acrylates and polyester urethane acrylates with outstanding physical properties. More specifically, the present invention is related to the synthesis of two component polyurethanes, thermoplastic urethanes, polyurethane dispersions, polyester acrylates and polyester urethane acrylates using high performance polyester polyols with high proportion of biorenewable content derived from biological sources.

BACKGROUND OF THE INVENTION

Polyester polyols have been manufactured for several decades using monomers derived from fossil hydrocarbons for use in urethane systems including two component polyurethanes, thermoplastic urethanes, polyurethane dispersions, polyester acrylates and polyester urethane acrylates. In recent years there has been a growing interest in the urethane industry for replacing petroleum-derived monomers used in the synthesis of polyester polyols with renewable monomers derived from biological sources. Examples of such biorenewable monomers useful in the polyester polyol synthesis include, but not restricted to 1, 3-propanediol, succinic acid, dimer acids, and isosorbide. Using a combination of biorenewable monomers, it is possible to manufacture a polyester polyol with 95% or more biobased content useful in urethane systems.

A number of commercial products and the feedstocks derived from renewable biological sources offer an alternative to similar products and feedstocks currently derived from petroleum sources. Although there is a desire to use commercial products derived from renewable biological sources, there has been a concern that the physical properties of the products and feedstocks derived from renewable biological sources may not be able to meet the physical properties of the similar products and feedstocks derived from petroleum sources. Commonly held perception about products and feedstocks derived from renewable biological sources include fears of poor color, bad odor and poor performance. As a result, there has been reluctance in using products and feedstocks derived from biological sources. At the best, the products and feedstocks derived from biological sources are diluted with similar products and feedstocks derived from petroleum sources in order to achieve desirable physical properties such as tensile strength, elongation, adhesion and abrasion resistance. The objective of this present invention is to develop a method of manufacturing that yields a polyester polyol that not only contains a very high percent of bio-renewable content but also exhibits superior mechanical properties and are ideally suitable for use in high performance urethane systems.

The present invention provides a process for manufacturing a number of polyester polyols using the feedstocks derived from biological sources. The polyester polyols derived from biological sources according to the present invention are useful in a number of applications including the synthesis of two component polyurethanes, thermoplastic urethanes, polyurethane dispersions, polyester acrylates and polyester urethane acrylates with desirable physical properties.

SUMMARY OF THE INVENTION

This present invention provides a process for manufacturing polyurethane systems including two component polyurethanes, thermoplastic urethanes, polyurethane dispersions, polyester acrylates and polyester urethane acrylates. The polyurethane systems of the present invention are derived from polyester polyols with high percentage of biorenewable content.

In one embodiment, the present invention provides a process for producing polyester polyols with high percentage of biorenewable content. In the preferred aspect of this embodiment, the polyester polyols produced according to the present invention contain at least 50% biorenewable content. In general, according to this embodiment, polyester polyols are produced using a polyfunctional carboxylic acid and a polyhydric alcohol. In a preferred aspect, the polyfunctional carboxylic acid is a dicarboxylic acid and the polyhydric alcohol is a diol. In yet another preferred aspect of this embodiment, both dicarboxylic acid and diol used in the preparation of the polyester polyols are derived from renewable biological sources. In one aspect of this embodiment, the succinic acid derived from biological sources is used as a source of dicarboxylic acid. In another aspect of this embodiment, adipic acid derived either from biological sources or petroleum source is used as a source of dicarboxylic acid. In one aspect of this embodiment, 1, 3-propanediol derived from biological sources is used as a source of diol in the preparation of polyester polyols. In yet another aspect of this embodiment, isosorbide derived from biological sources is used as a source of diol. In another aspect of this embodiment, the dimer acid used in the preparation of flexible polyester polyol is derived from biological sources.

In another embodiment of the present invention, a general purpose polyester polyol called HP 210 (High Performance 210) with a hydroxyl number of 200-220 and a functionality of ~2.1 is provided. In one aspect of this embodiment, a general purpose polyester HP 210 is produced using renewable succinic acid, 1,3-propanediol and isosorbide. HP 210 provides a good starting point with a balance of flexibility and hardness necessary for the manufacture of various polyurethanes of the present invention. In one aspect of this embodiment, a hard and highly crosslinked polyester polyol called HP 310 (High Performance 310) with a hydroxyl number of 310-340 and a functionality of 2.5 is provided. In yet another aspect of this embodiment, a flexible version of polyester polyol called HP 210 Flex (High Performance 210 Flex) is provided. HP 210 Flex polyester polyol is similar to HP 210 polyester polyol with a hydroxyl number of 200-220 and functionality of ~2.1 but has added flexibility built into the polymeric backbone.

In another embodiment of the present invention, a process for producing two component urethanes is provided. In one aspect of this embodiment, polyester polyol prepared using succinic acid, isophthalic acid and 1,6-hexanediol is reacted with an isocyanate to yield a two component urethane. In another aspect of this embodiment, polyester polyol prepared using adipic acid, isophthalic acid and 1,6-hexanediol is reacted with an isocyanate to yield a two component urethane. In yet another aspect of this embodiment, HP 210 polyester polyol prepared using renewable succinic acid, renewable 1,3-propanediol, and renewable isosorbide is reacted with an isocyanate to yield a general purpose urethane. In yet another aspect of this embodiment, the hard and highly crosslinked polyester polyol HP 310 is reacted with an isocyanate to yield polyurethane which is hard in its physical structure. In yet another aspect of this embodiment, the flexible polyester polyol HP 210 Flex is reacted with an isocyanate to yield flexible polyurethane. The terms two component urethanes, general purpose urethane and flexible polyurethane used in this patent specifications are well known to a person skilled in the art.

In another embodiment of the present invention, a process is provided to prepare a polyurethane dispersion using one or other type of polyester polyol. In one aspect of this present embodiment, a general purpose polyester polyol is used to prepare a polyurethane dispersion. In another aspect of the present invention, a hard and highly cross-linked polyester polyol is used to prepare a polyurethane dispersion. In another aspect of this embodiment, a flexible polyester polyol is used to prepare a polyurethane dispersion. In some embodiments, the polyurethane of the dispersion has a tensile strength loss of no more than 50% after 500 hours in a humidity chamber with 100% relative humidity and temperature of 120° F. In other embodiments, the polyurethane in the polyurethane dispersion has a pendulum hardness of at least 200 seconds.

In another embodiment of the present invention, a process is provided to prepare a thermoplastic urethane using one or other type of polyester polyol. In one aspect of this embodiment, a general purpose polyester polyol HP 56 is used to prepare a thermoplastic urethane. In some embodiments, the thermoplastic urethane has a tear strength of at least 2000 psi. In other embodiments, the thermoplastic urethane has an ethylene acetate absorption of no more than 40% and a toluene absorption of no more than 10%.

In yet another embodiment of the present invention, a process for producing polyester acrylate and polyester urethane acrylate using a polyester polyol derived from biological sources is provided.

BRIEF DESCRIPTION OF THE DRAWINGS

The following figures and tables are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF THE PREFERRED EMBODIMENTS

Figure 1:
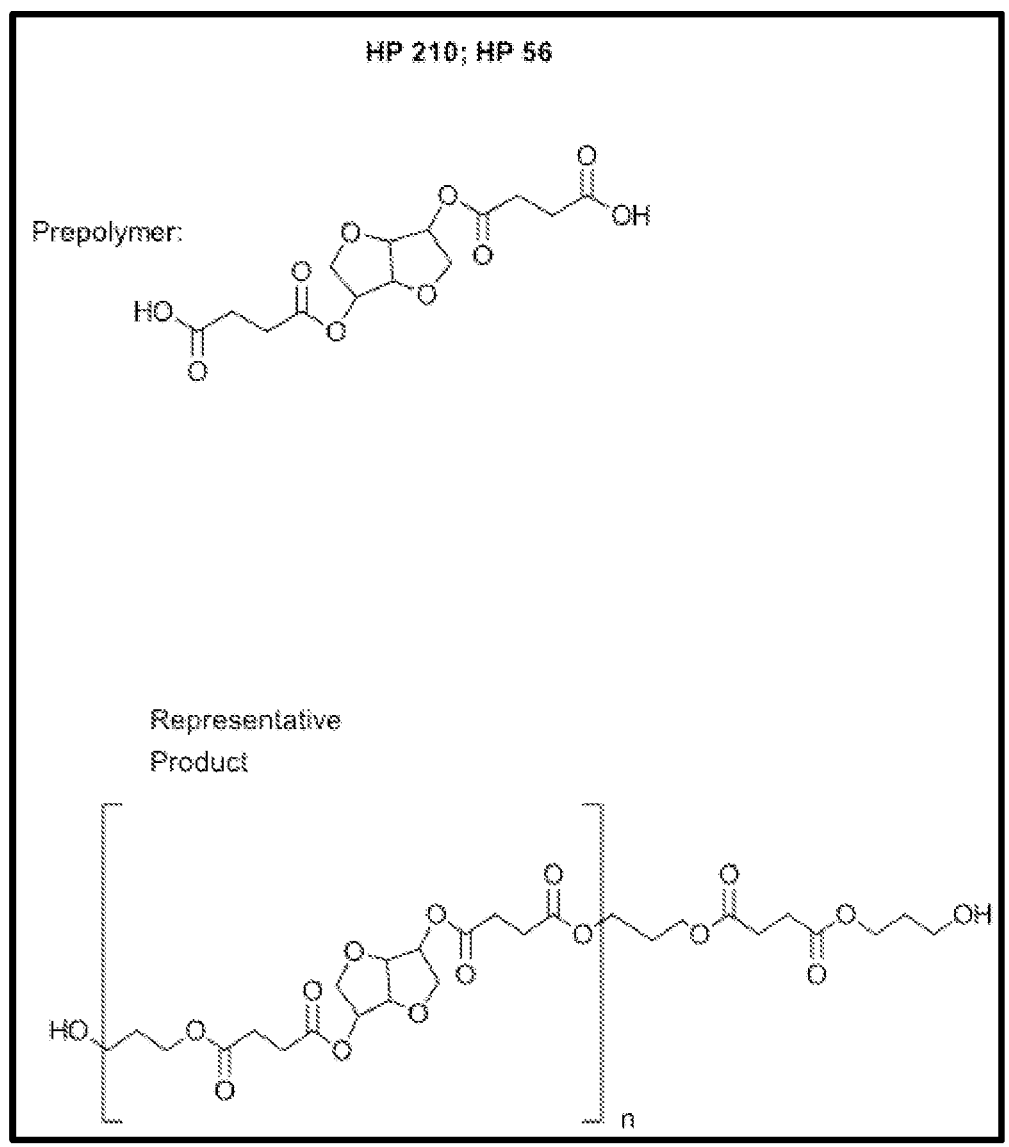
FIG. 1. Generalized chemical structure of high performance polyester polyols (HP 56, and HP 210) prepared using biorenewable succinic acid, isosorbide and 1,3-propanediol. Shown in this figure are the structure of prepolymer consisting of isosorbide and succinic acid and the structure of a representative polyester polyol product.
Figure 2:
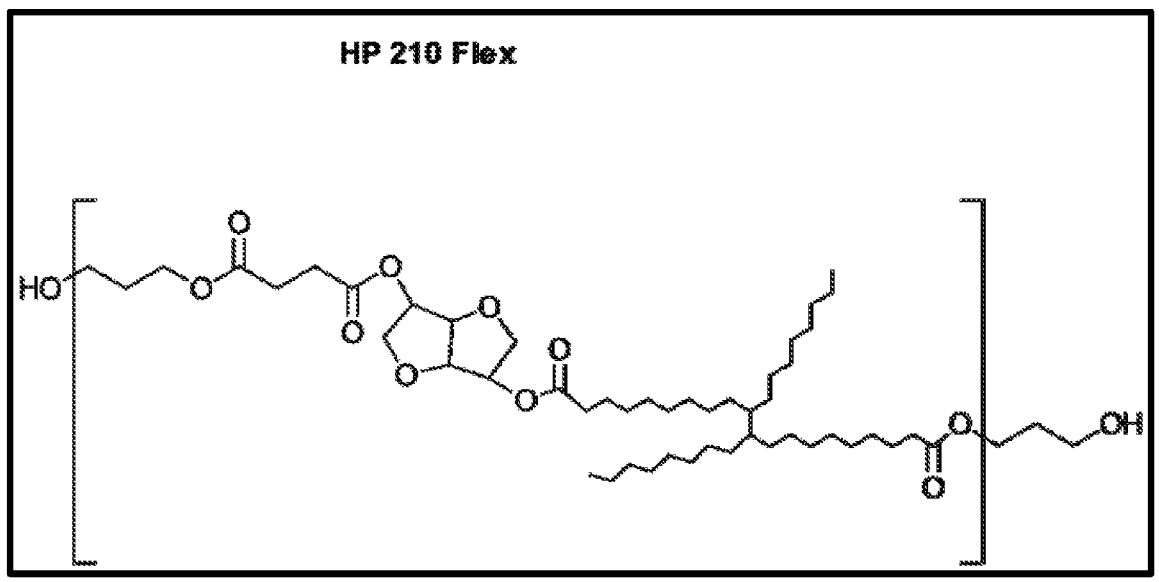
FIG. 2. Chemical structure of the flexible high performance polyester polyol HP 210 Flex prepared using biorenewable succinic acid, biorenewable isosorbide, biorenewable 1,3-propanediol and dimer acid Radiacid 0976.
Figure 3:
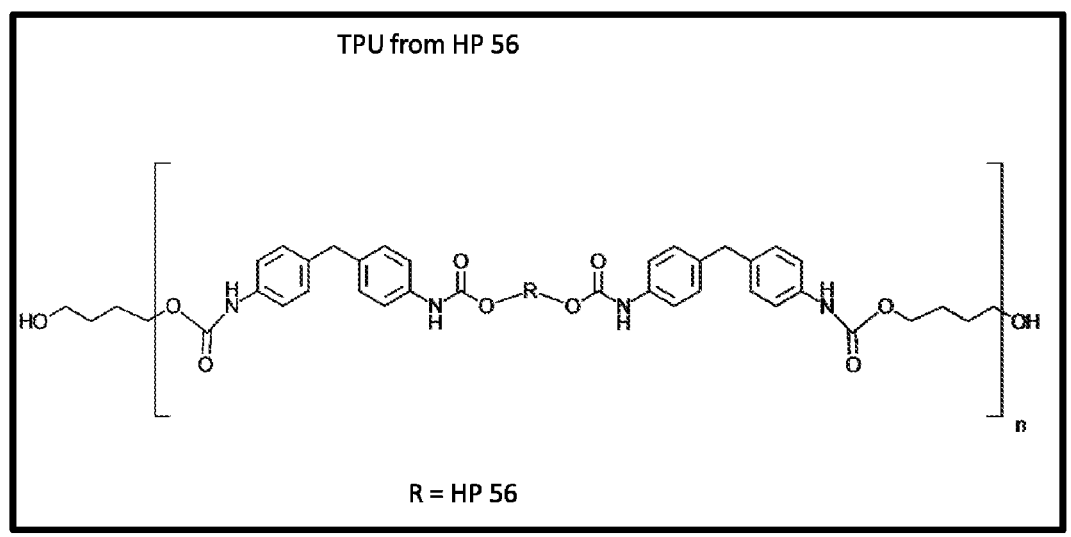
FIG. 3. Chemical structure of thermoplastic urethane prepared using the general purpose high performance polyester polyol HP 56, isocyanate MDI and 1,4-butanediol.
Figure 4:
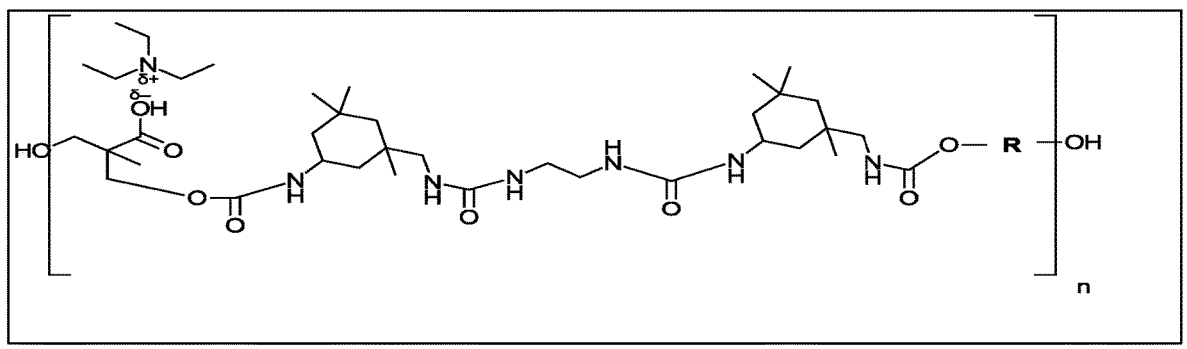
FIG. 4. Chemical structure of polyurethane dispersion prepared using the general purpose High Performance polyester polyol HP 210, High Performance flexible polyester polyol HP 210 Flex, polyester polyol comprising isophthalic acid (IPA), adipic acid (AA) and 1,6-hexanediol (HDO) and polyester polyol comprising isophthalic acid (IPA), succinic acid (SAC) and 1,6-hexanediol (HDO).
Figure 5:
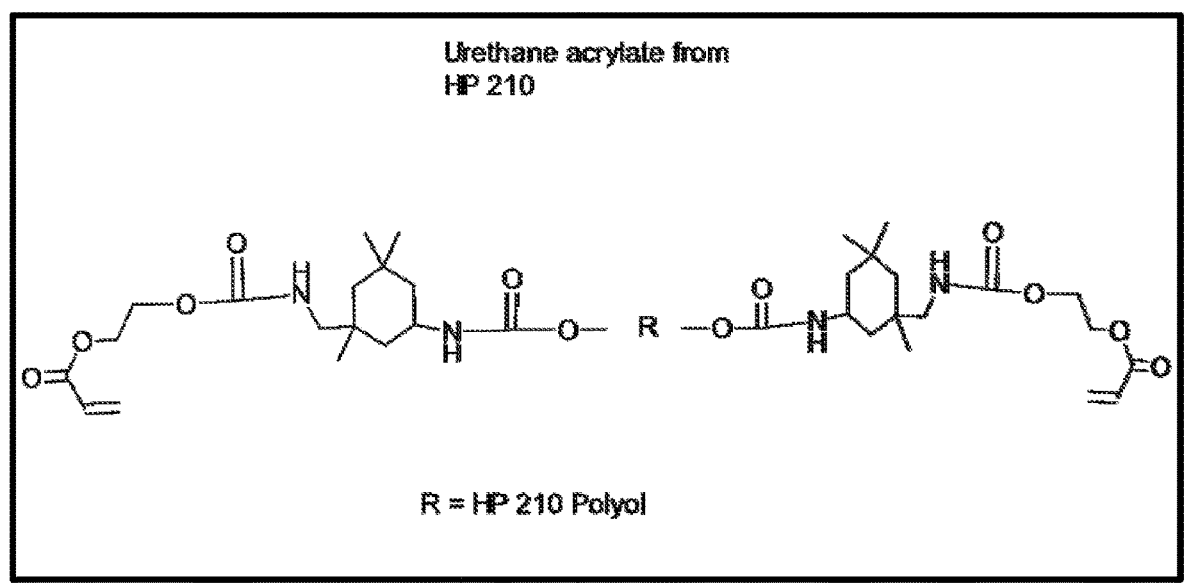
FIG. 5. Chemical structure of urethane acrylate prepared using the general purpose high performance polyester polyol HP 210.

The term "biobased" as used herein refers to polyester polyols with at least about 50% by weight or more of the contents of which are directly or indirectly obtained from a monomers derived from renewable feedstock. The term "biorenewable" is also used interchangeably with the terms "biobased" and "renewable".

As defined in this invention, renewable biological material includes any feedstock derived from plant or animal materials as opposed to the materials derived from petrochemical feedstock. The term "renewable biological material" is also used interchangeably with the term "biomass". The term "biomass" as used in the present invention refers to carbohydrates, sugars, glycerol and lignocellulosic materials derived from renewable plant resources which can be used in the fermentative production of monomers useful in the present invention. The monomers such as succinic acid, 1,3-propanediol and its derivatives obtained from renewable biological materials are referred to as "biomass-derived" or "biobased" or "biorenewable" or "renewable". On the other hand succinic acid, 1,3-propanediol and its derivatives obtained from petrochemical feedstock are referred as "petrochemical-derived" or "petrochemical-based".

The biobased monomers useful in the present invention can be distinguished from monomers manufactured following the traditional methods involving petroleum feedstock on the basis of their carbon-14 content following the method ASTM-D6866 provided by American Society of Testing and Materials. Cosmic radiation produces $^{14}C$ ("radiocarbon") in the stratosphere by neutron bombardment of nitrogen. $^{14}C$ atoms combine with oxygen atom in the atmosphere to form heavy $^{14}CO_2$, which, except in the radioactive decay, is indistinguishable from the ordinary carbon dioxide. $CO_2$ concentration and the $^{14}C/^{12}C$ ratio is homogeneous over the globe and because it is used by the plants, the ratio $^{14}C/^{12}C$ is retained by the biomass while the content of $^{14}C$ in the fossil materials, originally derived from photosynthetic energy conversion, has decayed due to its short half-life of 5730 years. By means of analyzing the ratio of $^{14}C$ to $^{12}C$, it is possible to determine the ratio of fossil fuel derived carbon to biomass-derived carbon. International Patent Application Publication No. WO2009/155085 A2 and U.S. Pat. No. 6,428,767 provide details about the use of ASTM-D6866 method for determining percent of biomass-derived carbon content in a chemical composition. The details related to carbon dating disclosed in the U.S. Pat. No. 6,428,767 are incorporated herein by reference. An application note from Perkin Elmer entitled "Differentiation between Fossil and Biofuels by Liquid Scintillation Beta Spectrometry—Direct Method" provides details about the methods involving ASTM Standard D6866.

In the first step, the present invention provides a process for preparing polyester polyols using one or more monomeric dicarboxylic acids and one or more diols. In preferred embodiments, the monomeric dicarboxylic acids and diols are derived from renewable biological sources. In the second step of the present invention, a process for producing one or other polyurethane systems using the polyester polyol produced in the first step of the present invention is provided. In one embodiment of the present invention, a process for producing two component polyurethane systems using one or other polyester polyol with at least 50% biobased component is provided. In another embodiment of the present invention, a process for producing one or other type of polyurethane dispersion using the polyester polyols with at least 50% of biobased component is provided. In another embodiment of the present invention, a process for producing polyester urethane acrylate using polyester polyols with at least 50% biobased component is provided.

The biobased polyester polyols are prepared by reacting monomeric polyfunctional carboxylic acid and polyhydric alcohol derived from biological sources in an esterification reaction. In the preferred embodiment of the present invention, the polyfunctional carboxylic acid is a dicarboxylic acid and the polyhydric alcohol is a diol. The esterification reactions can be conducted with a range of monomers for polyester synthesis. A number of polyfunctional carboxylic acid and polyhydric alcohols may be used. The list of polyfunctional carboxylic acids (or their alkyl esters) suitable for the present invention includes but may not be limited to: succinic acid, glutaric acid, pimelic acid, undecanoic acid, dodecanoic acid, dodecanedioic acid, subaric acid, azelaic acid, sebacic acid, adipic acid, phthalic anhydride; dimethyl terephthalate, terephthalic acid, isophthalic acid, 1,8-naphthalic anhydride, 1,8-naphthalic dicarboxylic acid, 1,8-dimethyl naphthalate, dimethyl isophthalate, phthalic acid, dimethyl terephthalate bottoms, phthalic anhydride bottoms, pyromellitic anhydride, mellitic anhydride, mellitic acid, trimellitic anhydride, 3,3'4,4'-benzophenone tetracarboxylic anhydride, 3,3'4,4'-benzophenone tetracarboxylic acid, trimellitic acid, polyethylene terephthalate recycled polymer, polybutylene terephthalate recycled polymer, polyethylene terephthalate virgin polymer, polybutylene terephthalate virgin polymer, mixtures thereof and the like.

Preferred examples of polyhydric alcohols suitable for use in preparing polyester polyols include glycerin, ethylene glycol, diethylene glycol, triethylene glycol, tetraethylene glycol, propylene glycol, dipropylene glycol, tripropylene glycol, tetrapropylene glycol, trimethylene glycol, 1,1,1-trimethylol ethane, 1,2,3-trimethylolpropane, pentaerythritol, and poly(oxyalkylene) polyols in which each repeating unit contains two to four carbon atoms derived from the polyaddition of ethylene oxide, propylene oxide, or butylene oxide and mixtures thereof.

The biobased polyester polyol possesses a hydroxyl value (OH) ranging from about 25 to about 330, particularly from about 40 to about 130, more particularly from about 50 to about 100.

A polyester polyol comprising 30.8% isosorbide, 49.8% succinic acid and 19.3% 1,3-propanediol would have a theoretical hydroxyl number of 56.1 and an OH functionality of 2.0. This polyester polyol could be used to synthesize any number or polyurethane products. However, if all reactants were reacted initially in a one-stage process, the pendant hydroxyl groups would all be secondary; as the primary hydroxyl groups of 1,3-propanediol would react preferentially first. While the resulting polyester polyol is adequate, this is not an ideal starting material for the synthesis of a polyurethane system. The present invention provides a modified two stage process to produce a polyester polyol with desirable properties.

According to the present invention, in a reaction involving succinic acid, 1, 3-propanediol and isosorbide, instead of reacting all the three components in a single step to achieve a desirable acid value, 1,3-propanediol is added in two stages or in a preferred aspect of this embodiment the 1,3-propanediol is added only in a second stage. In the first stage, all of the isosorbide would have reacted with succinic acid and when 1,3-propanediol is added in the second stage, it would yield a final polyester polyol where the remaining hydroxyl groups would be predominately primary hydroxyl groups. It is generally expected that the addition of 1, 3-propanediol in the second stage would in effect transesterify the acid functional groups of isosorbide succinate polyester and thereby would regenerate secondary hydroxyls. However, the hindered nature of the isosorbide linkages would in effect reduce the rate of transesterification and as a result the resulting polyester polyol would have the following benefits over a one-step process: (1) Majority of hydroxyl groups are primary hydroxyl groups; (2) The resulting polyester polyol has an increased hydrolytic stability; (3) The reaction process has a reduced cycle time (the cook time required to react the polyester); and (4) Surprisingly the urethane products resulting resulting from the use of the polyester polyols prepared according to the present invention have superior mechanical properties.

Further improvement in the mechanical performance of the polyester polyol prepared as described can be achieved by means of adding a small amount of trifunctional materials. If the molecular weight of resulting polyester polyol is too high, it will not remain a liquid or amorphous solid upon the completion of the synthesis. Rather, it will form a polymerized gel in the reactor and will be unusable as raw material for urethane synthesis. If, however, a portion of the trifunctional material is held out until the end and then post-blended, the polyester polyol product remains a liquid and surprisingly exhibits the performance of the highly crosslinked material. Furthermore, even if the addition of all of the crosslinking monomer upfront yields a polyester polyol with workable liquid properties, the viscosity and resultant physical properties of the urethane will be inferior to a polyester undergoing process wherein a portion of the trifunctional monomer is blended at the end in the preparation of polyester polyol.

The present invention also relates to synthesizing a polyurethane system from the inventive polyester polyols described herein when coupled with a polyisocyanate, catalyst(s), and one or more optional additives or auxiliary compounds such as cross-linking agents and extenders.

The polyisocyanates which may be used in the present invention include aliphatic, cycloaliphatic, arylaliphatic and aromatic polyisocyanates having at least 2 isocyanate groups. For the production of flexible slabstock foam, aromatic polyisocyanates are preferred. Examples of suitable aromatic polyisocyanates include the 4,4'-, 2,4' and 2,2'-isomers of diphenylmethane diisocyanate (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4, 4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2, 4- and 2, 6-isomers of toluene diisocyantes. TDI/MDI blends may also be used. MDI or TDI based prepolymers made with a polyol can also be used. Isocyanate-terminated prepolymers are prepared by reacting an excess of polyisocyanate with polyols, including aminated polyols or imines/enamines thereof, or polyamines.

Examples of aliphatic polyisocyanates include ethylene diisocyanate, 1,6-hexamethylene diisocyanate (HDI), isophorone diisocyanate (IPDI), cyclohexane 1,4-diisocyanate, 4,4'-dicyclohexylmethane diisocyanate ($H_{12}MDI$), saturated analogues of the above mentioned aromatic isocyanates and mixtures thereof.

The preferred polyisocyanates are the toluene-2, 4- and 2, 6-diisocyanates or MDI or combinations of TDI/MDI or prepolymers made therefrom.

One or more catalysts for the reaction of the polyester polyol with the polyisocyanate can be used. Any suitable urethane catalyst may be used, including tertiary amine compounds, amines with isocyanate reactive groups and organometallic compounds. Exemplary tertiary amine catalysts include triethylenediamine, N-methylmorpholine, N, N-dimethylcyclohexylamine, pentamethyldiethylenetriamine, tetramethylethylenediamine, bis (dimethylaminoethyl)ether, 1-methyl-4-dimethylaminoethyl-piperazine, 3-methoxy-N-dimethylpropylamine, N-ethylmorpholine; dimethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include organobismuth, organomercury, organolead, organoferric and organotin catalysts, with organotin catalysts being preferred among these. Suitable tin catalysts include stannous chloride, tin salts of carboxylic acids such as dibutyltin dilaurate, and stannous octoate, as well as other organometallic compounds. A catalyst for the trimerization of polyisocyanates, resulting in a polyisocyanurate, such as an alkali metal alkoxide may also optionally be employed herein. The amount of amine catalyst can generally vary from 0.02 to 5 percent in the formulation. The amount of organometallic catalyst can generally vary from 0.001 to 1 percent in the formulation.

A crosslinking agent or a chain extender may be added as additive or auxiliary compound, if desired. The crosslinking agent or the chain extender includes low-molecular weight polyhydric alcohols such as ethylene glycol, diethylene glycol, 1,4-butanediol, and glycerin; low-molecular weight amine polyol such as diethanolamine and triethanolamine; polyamines such as ethylene diamine, xylylenediamine, and methylene-bis(o-chloroaniline).

The polyurethane products are either produced continuously or discontinuously, by injection, pouring, spraying, casting and calendering. These polyurethane products are made under free rise or molded conditions, with or without release agents, in-mold coating, or any inserts or skin put in the mold. Flexible slabstock foam is conveniently prepared by mixing the foam ingredients and dispensing them into a trough or other region where the reaction mixture reacts, rises freely against the atmosphere (sometimes under a film or other flexible covering) and cures. In common commercial scale flexible slabstock foam production, the foam ingredients or various mixtures thereof are pumped independently to a mixing head where they are mixed and dispensed onto a conveyor that is lined with paper or plastic. Foaming and curing occurs on the conveyor to form a foam bun. The resulting foams are typically from about 10 $kg/m^3$ to a maximum of 80 $kg/m^3$ in density. A preferred range is from about 10 $kg/m^3$ to 60 $kg/m^3$ and more preferably from about 10 $kg/m^3$ to 50 $kg/m^3$ in density. In an even more preferred embodiment the flexible slabstock foam has a density of 40 $kg/m^3$ or less.

In another embodiment, the present invention provides a process for preparing polyurethane dispersions. In the preparation of polyurethane dispersions, any number of polyester polyols with desirable biorenewable content can be used. In certain preferred aspect of this embodiment, the following five types of polyester polyols are used in the present invention: (1) A control polyester synthesized from isophthalic acid, adipic acid and 1,6-hexanediol with hydroxyl number in the range of 200-220 and theoretical functionality of 2.0; (2) A standard, bio-based polyester polyol comprising of isophthalic acid, succinic acid and 1,6-hexanediol with hydroxyl number in the range of 200-220 and theoretical functionality of 2.0; (3) The general purpose, high performance polyester polyol material including HP 210 described above with hydroxyl number in the range of 200-220 and a theoretical functionality of 2.1; (4) The flexible high performance polyester polyol material HP 110 Flex described above with hydroxyl number of approximately 78 and a theoretical functionality of 2.1; (5) The high performance polyester polyol material HP 56 described above with hydroxyl number of approximately 728. and a theoretical functionality of 2.1.

Using the polyester polyols described in the paragraph above, polyurethane dispersions can be synthesized using the isocyanate such as isophorone diisocyanate (IPDI), the neutralizing amine triethyl amine (TEA) and the chain extending ethylene diamine and following either the acetone process or NMP process. In general for the acetone process, the polyester polyol and acetone are charged in a glass vessel and the glass vessel is warmed to reflux under nitrogen atmosphere. In the next step, 2,2-bis(hydroxymethyl)propionic acid (DMPA) and TEA are added followed by the slow addition of IPDI and a catalyst to initiate the reaction. During the course of the reaction, an isocyanate determination titration is carried out to make sure that appropriate specification of the end product is achieved. Once the desired specification is achieved, water is added followed by the addition of ethylene diamine. At the end of the reaction, the acetone is distilled out to obtain a polyurethane dispersion. However, it should be realized that a polyurethane dispersion according to the present embodiment can be prepared using other types of polyester polyols derived from renewable biological sources and using alternate isocyanates.

In another embodiment, the present invention provides a process for the production of urethane acrylate using general purpose polyester polyol derived from renewable biological sources described above, isophorone diisocyanate (IPDI) and 2-hydroxyethyl acrylate (HEA). However, it should be realized that a urethane acrylate according to the present embodiment can be prepared using other types of polyester polyols derived from renewable biological sources and using alternate isocyanates and alternate hydroxyl functional acrylate monomers.

EXPERIMENTAL SECTION

General Remarks

Determination of Acid Value:

Approximately 1.00-2.00 grams of sample is added to an Erlenmeyer flask followed by the addition of approximately 75 ml of toluene. The sample is dissolved using a stir bar. The flask may be subjected to heating to dissolve the sample. Once the sample is dissolved, 75 ml of Acid Value Solution comprising ⅔ (v/v) toluene and ⅓ (v/v) methanol and 3-5 ml of 2% ethanolic phenolphthalein in a total volume of 1,000 ml is added. After the addition of the Acid Value Solution, the solution is titrated with 0.1N methanolic potassium hydroxide (KOH) to a pink end-point. The Acid Value is calculated from the following formula: Acid Value=[V× N×56.1]/Sample weight (g) where V is the volume in milliliters of KOH solution added and N is the normality of the KOH solution.

Determination of Hydroxyl Value:

Acetic anhydride reagent solution is prepared by mixing 60 mL of acetic anhydride, 7.2 g p-toluenesulfonic acid and 180 mL of ethyl acetate. Pyridine-water solution is prepared by adding approximately 3 mL pyridine for each 1 mL of water. For determining hydroxyl value, approximately 0.75 to 5.0 grams of sample is weighed into a 250 mL acetylation flask. The mass of the sample to be used for the analysis of hydroxyl value depends on expected hydroxyl value. 5 mL of acetic anhydride reagent is added into each flask and attached to an air condenser. Reagent blanks are prepared in parallel, with no sample but corresponding volume of reagent. The flasks are immersed to liquid level in 70-72° C. bath and swirled until all solid material is melted and thoroughly mixed. After heating the solution at 70-72° C. for one hour, the flasks are removed and cooled for at least 10 minutes in a room temperature bath. 2 mL of DI water is added to each flask, through the air condenser, followed by the addition of 10 mL pyridine-water solution through the air condenser. The flasks are swirled vigorously to mix the contents thoroughly. The flasks are returned to the 70-72° C. bath for 10 minutes to complete the hydrolysis of the excess acetic anhydride reagent and swirled at frequent intervals. The flasks are removed and cooled in the cooling bath for at least 10 minutes. The condenser is removed and 1 mL of cresol red-thymol blue indicator solution is added to the flask. A magnetic stir bar is added to the flasks and the samples and blanks are titrated using 0.5N methanolic potassium hydroxide. The end point of the blank is a bold blue color with no trace of red. The end point of the sample depends on the color of the sample, but is usually a deep gray-blue with the disappearance of the last trace of red. Samples are heated under hot water to release any remaining occluded traces of acid just before the end of the titration. The hydroxyl value is calculated as follows: [(mL KOH blank—mL KOH sample)*N KOH*53.1]/grams sample.

Determination of Percent Isocyanate:

The percent isocyanate is determined using the following protocol. In a flask, 40 ml of dibutylamine is added to 500 ml of toluene and the resulting solution is referred as DBA solution. In determining percent isocyanate, 1.0-3.0 grams of test sample is added to 50 ml of toluene in a 250 ml Erlenmeyer flask and placed on a stirring plate until the test sample is fully dissolved. Once the sample is completely dissolved, 20 mL of DBA solution and 2 drops of bromophenol blue indicator are added followed by titration with 0.5N hydrochloric acid in isopropanol until the purple color of the solution turns to bright yellow endpoint. A "blank" containing only 50 mL toluene, 20 mL of DBA solution and the bromophenol blue indicator is prepared and titrated in the same fashion. The total volumes of 0.5N hydrochloric acid added to reach the endpoint for both the "blank" and "sample" solutions are noted. The percent isocyanate of the test sample is calculated using the following formula: Percent isocyanate=[(volume of 0.5N hydrochloric acid added to the "blank"—volume of 0.5N hydrochloric acid added to the "sample")×2.101]/sample weight.

Determination of total solid content of polyurethane samples is carried out as per the method in ASTM D4906-95. Determination of viscosity of polyurethane samples is carried out as per the method in ASTM D445-15a. Determination of hardness of polyurethane samples is carried out as per the method in ASTM D2240. Determination of adhesion property of polyurethane samples is carried out as per the method in ASTM D3359. Determination of tensile properties of polyurethane samples is carried out as per the method in ASM D638. These ASTM protocols for the determination of various physical properties of polyurethane samples are well known to a person skilled in the art.

Example 1

HDO-SAC-Isophthalic Acid Polyester Polyol (Myr113-132)

1456 grams of 1,6-hexanediol ("HDO") was added to a mixture containing 393 grams of isophthalic acid and 652 grams of succinic acid ("SAC") and cooked at 205° C. until acid value goes below 20. At that point 0.63 grams of Reaxis C-256 catalyst was added and cooking at 205° C. was continued until the acid value reached a value below 1. The hydroxyl value of the resulting HDO-Isopthalic acid-SAC polyester polyol was found to be 206.7.

Example 2

HDO-AA-Isophthalic Acid Polyester Polyol (Myr113-137)

1391 grams of 1,6-hexanediol ("HDO") was added to a mixture containing 747 grams of adipic acid ("AA") and 364 grams of isophthalic acid and cooked at 205° C. until acid value goes below 20. At that point 0.63 grams of Reaxis C-256 catalyst was added and cooking at 205° C. was continued until the acid value reached a value below 1. The hydroxyl value of the resulting polyester polyol was found to be 215.

Example 3

HP 210 Polyester Polyol (Myr113-128)

In a glass vessel, 1223 grams of biorenewable isosorbide, 240 grams of biorenewable 1,3-propanediol, 224 grams of trimethylol propane, 1976 grams of biopreneable succinic acid, 9.9 grams Anox 1315 (Addivant; antioxidant to minimize color formation) and 0.68 grams of Reaxis C-256 catalyst were added and cooked at 210° C. under nitrogen for 13 hours to reach an acid value of about 120. During this initial cooking biorenwable succinic acid reacts with the secondary hydroxyl groups on biorenewable isosorbide instead of the primary hydroxyl group on biorenewable 1,3-propanediol and trimethylol propane. At the end of this initial cooking period, 875 grams of biorenewable 1,3-propanediol was added and cooking was continued at 205° C. until the acid value reached below 20. At this point 0.68 grams of Reaxis C-256 catalyst was added and the cooking as continued till the acid value fell below 1. The hydroxyl number of the final product was 253.6.

The HDO-AA-Isophthalic acid polyester polyol, HDO-SAC-Isophthalic acid polyester polyol and High Performance 210 (HP 210) polyester polyol were tested for their pH, total solid content and viscosity and the results are shown in Table 1.

Example 4

HP 310 Polyester Polyol (Myr113-140)

92 grams of HP 210 polyol prepared as described in Example 3 above was blended with 8 grams of trimethylol propane under nitrogen at 80° C. The hydroxyl value of the resulting product was 333.

Example 5

HP 210 Flex Polyester Polyol (Myr113-130)

In a glass vessel, 358 grams of biorenwable isosorbide, 47 grams of biorenewable 1,3-propanediol, biorenwable 434 grams of succinic acid, 3.9 grams Anox 1315 (antioxidant to minimize color formation) and 0.3 grams of Reaxis C-256 catalyst were added and cooked at 210° C. under nitrogen for 9 hours to reach an acid value of about 120. During this initial cooking perioid, succinic acid reacts with the secondary hydroxyl groups on biorenewable isosorbide instead of the primary hydroxyl group on biorenewable 1,3-propanediol and trimethylol propane. At the end of this initial cooking period, 65.7 grams of trimethylol propane, 410 grams of 1,3-propanediol and 701 grams of Radiacid 0976 (Oleon; dimer acid to increase flexibility) was added and cooking was continued at 205° C. until the acid value reached below 20. At this point 0.3 grams of Reaxis C-256 catalyst was added and the cooking was continued until the acid value fell below 1. The hydroxyl number of the final product was 253.6. It is also possible to use a trimer acid such as PRIPOL 1040 (Croda International Plc., East York Shire, United Kingdom) inpalce of a dimer acid in the preparation os flexible polyester polyol.

Example 6

HP 110 Flex Polyester Polyol (Myr173-46)

In a glass vessel, 248 grams of biorenewable isosorbide, 262 grams of biorenewable succinic acid, 641 grams of Radiacid 0976 (Oleon; dimer acid to increase flexibility), 3.2 grams Anox 1315 (Addivant; antioxidant to minimize color formation) and 0.24 grams of Reaxis C-256 catalyst were added and cooked at 210° C. under nitrogen for 9 hours to reach an acid value of about 120. During this initial cooking succinic acid reacts with the secondary hydroxyl groups on isosorbide instead of the primary hydroxyl group on biorenewable 1,3-propanediol and trimethylol propane. At the end of this initial cooking period, 22.8 grams of trimethylol propane, 304 grams of biorenewable 1,3-propanediol and biorenewable 132 grams succinic acid was added and cooking was continued at 205° C. until the acid value reached below 20. At this point 0.24 grams of Reaxis C-256 catalyst was added and the cooking as continued until the acid value fell below 1. The hydroxyl number of the final product was 78.

Example 7

HP 56 Polyester Polyol (Myr160-44)

In a glass vessel, 722 grams of isosorbide, 1247 grams of succinic acid, 160 grams of 1,3-propanediol, 5 grams Anox 1315 (Addivant; antioxidant to minimize color formation) and 0.5 grams of Reaxis C-256 catalyst were added and cooked at 210° C. under nitrogen for 9 hours to reach an acid value of about 150. During this initial cooking succinic acid reacts with the secondary hydroxyl groups on isosorbide instead of the primary hydroxyl group on 1,3-propanediol. At the end of this initial cooking period, 331 grams of 1,3-propanediol was added and cooking was continued at 205° C. until the acid value reached below 20. At this point 0.5 grams of Reaxis C-256 catalyst was added and the cooking as continued until the acid value fell below 1. The hydroxyl number of the final product was 72.8.

Example 8

HDO-SAC Polyester Polyol 1378 grams of 1,6-hexanediol was added to a mixture containing 1122 grams of succinic acid and cooked at 205° C. until acid value went below 20. At that point 0.63 grams of Reaxis C-256 catalyst was added and cooking at 205° C. was continued until the acid value reached a value below 1. The hydroxyl value of the resulting HDO-SAC polyester polyol was found to be 108.

Example 9

HDO-Adipate Polyester Polyol 1261 grams of 1,6-hexanediol was added to a mixture containing 1239 grams of adipic acid and and cooked at 205° C. until acid value goes below 20. At that point 0.63 grams of Reaxis C-256 catalyst was added and cooking at 205° C. was continued until the acid value reached a value below 1. The hydroxyl value of the resulting polyester polyol was found to be 95.

Example 10

HDO-Adipic-Isophthalic Polyester Polyol Polyurethane Dispersion (Myr113-144)

Under a nitrogen atmosphere, 100 grams of HDO-AA-Isophthalic acid polyester polyol prepared as in Example 2 above, 56.6 grams of acetone, 12.8 grams of 2,2-bis(hydroxymethyl)propionic acid (DMPA) and 8.7 grams of trimethylamine (TEA) were added to a glass vessel and stirred until DMPA was dissolved. In the next step, 96.6 grams of isophorone diisocyanate was added slowly over 15 minutes followed by the addition of 0.08 grams of dibutyltin dilaureate and the reaction is allowed to proceed until the percentage of isocyanate was below 5% or held constant. In the next step, 363.9 grams of water was added exponentially followed by the addition of 8.2 grams of ethylene diamine. The temperature was gradually increased to distill off acetone.

Example 11

HDO-SAC-Isophthalic Polyester Polyol Polyurethane Dispersion (Myr113-146)

Under a nitrogen atmosphere, 100 grams of HDO-SAC-Isophthalic acid polyester polyol prepared as in Example 1 above, 55.4 grams of acetone, 12.4 grams of 2,2-bis(hydroxymethyl)propionic acid (DMPA) and 8.4 grams of trimethylamine (TEA) were added to a glass vessel and stirred until DMPA was dissolved. In the next step, 93 grams of isophorone diisocyanate was added slowly over 15 minutes followed by the addition of 0.08 grams of dibutyltin dilaureate and the reaction is allowed to proceed until the percentage of isocyanate was below 5% or held constant. In the next step, 356.3 grams of water was added exponentially followed by the addition of 7.9 grams of ethylene diamine. The temperature was gradually increased to distill of acetone.

Example 12

HP 210 Polyester Polyol Polyurethane Dispersion (Myr113-148)

Under a nitrogen atmosphere, 100 grams of general purpose polyester polyol HP 210 prepared as in Example 3 above, 60.7 grams of acetone, 13.7 grams of 2,2-bis(hydroxymethyl)propionic acid (DMPA) and 9.3 grams of trimethylamine (TEA) were added to a glass vessel and stirred until DMPA was dissolved. In the next step, 110.3 grams of isophorone diisocyanate was added slowly over 15 minutes followed by the addition of 0.09 grams of dibutyltin dilaureate and the reaction is allowed to proceed until the percentage of isocyanate was below 5% or held constant. In the next step, 390 grams of water was added exponentially followed by the addition of 9.4 grams of ethylene diamine. The temperature was gradually increased to distill of acetone.

The polyurethane dispersions described in Examples 10, 11, and 12 were tested for pendulum hardness (ASTM D4366), crosshatch adhesion (ASTM D3359), and durometer hardness (ASTM D2240). The results from these physical analyses are shown in Tables 1 and 2.

Example 13

HP 110 Flex Polyester Polyol Polyurethane Dispersion

To a clean reaction vessel, 131.15 grams Vestanat H12MDI (Evonik Corporation, Parsippany, N.J., USA) was charged and agitation was begun. 728.57 grams HP 110 Flex was added, and the reaction was heated to 75° C. Then, 0.051 grams dibutyltin dilaureate was added, and the reaction was allowed to exotherm. After the exotherm subsided, the isocyanate content was checked and 106 grams of N-methyl-2-pyrrolidone was added to the reaction. Temperature was adjusted to maintain a temperature of approximately 90° C. and 67.1 grams 2,2-bis(hydroxymethyl)propionic acid (DMPA) were added to the reactor. The reaction was allowed to proceed while monitoring the isocyanate content. When the isocyanate content fell to within the desired range indicating prepolymer reaction completion, the reactor was cooled to around 78° C. The prepolymer was then transferred to a prepolymer tank and 1.0 equivalents of triethylamine (TEA) were added. Temperature was held around 78° C. An appropriate mass of water to achieve 35% solids content in the final PUD was added to the dispersion tank, in addition to 0.02% per batch weight of DEE FO® PI40 Defoamer (Munzing). The prepolymer/TEA solution was steadily added to the water in the dispersion tank with adequate agitation to disperse. The dispersion was mixed for 10 minutes once prepolymer addition was completed, and then a solution of water with 15% hydrazine was added to the dispersion with strong mixing. The reaction was monitored for completion by checking the isocyanate content using FTIR. When trace isocyanate remained, reaction was cooled and discharged through a 100 µm filter bag.

Example 14

HDO—AA Polyester Polyol Polyurethane Dispersion

To a clean reaction vessel, 131.15 grams Vestanat H12MDI (Evonik Corporation, Parsippany, N.J., USA) was charged and agitation was begun. 728.57 grams Piothane® 67-1000 (Panolam Industries International LLC, Shelton Conn.) polyester polyol derived from 1,6-hexanediol and adipic acid) was added, and the reaction was heated to 75° C. Then, 0.051 grams dibutyltin dilaureate was added, and the reaction was allowed to exotherm. After the exotherm subsided, the isocyanate content was checked and 106 grams of N-methyl-2-pyrrolidone was added to the reaction. Temperature was adjusted to maintain a temperature of approximately 90° C. and 67.1 grams 2,2-bis(hydroxymethyl)propionic acid (DMPA) were added to the reactor. The reaction was allowed to proceed while monitoring the isocyanate content. When the isocyanate content fell to within the desired range indicating prepolymer reaction completion, the reactor was cooled to around 78° C. The prepolymer was then transferred to a prepolymer tank and 1.0 equivalents of triethylamine (TEA) were added. Temperature was held around 78° C. An appropriate mass of water to achieve 35% solids content in the final PUD was added to the dispersion tank, in addition to 0.02% per batch weight of DEE FO® PI40 Defoamer (Munzing). The prepolymer/TEA soloution was steadily added to the water in the dispersion tank with adequate agitation to disperse. The dispersion was mixed for 10 minutes once prepolymer addition was completed, and then a solution of water with 15% hydrazine was added to the dispersion with strong mixing. The reaction was monitored for completion by checking the isocyanate content using FTIR. When trace isocyanate remained, reaction was cooled and discharged through a 100 µm filter bag.

Example 15

Polycarbonate Polyol Polyurethane Dispersion

To a clean reaction vessel, 131.15 grams Vestanat H12MDI (Evonik) was charged and agitation was begun. A blend of polycarbonate polyols Oxymer HD-112 and Oxymer HD-56 (Perstrop Holdings AB, Sweden) in combination trimethyol propane was created to achieve the same functionality and hydroxyl number as the HP 110 Flex. 728.57 grams of this polycarbonate material was added to the reaction vessel, and the reaction was heated to 75° C. Then, 0.051 grams dibutyltin dilaureate was added, and the reaction was allowed to exotherm. After the exotherm subsided, the isocyanate content was checked and 106 grams of N-methyl-2-pyrrolidone was added to the reaction. Temperature was adjusted to maintain a temperature of approximately 90° C. and 67.1 grams 2,2-bis(hydroxymethyl)propionic acid (DMPA) were added to the reactor. The reaction was allowed to proceed while monitoring the isocyanate content. When the isocyanate content fell to within the desired range indicating prepolymer reaction completion, the reactor was cooled to around 78° C. The prepolymer was then transferred to a prepolymer tank and 1.0 equivalents of triethylamine (TEA) were added. Temperature was held around 78° C. An appropriate mass of water to achieve 35% solids content in the final PUD was added to the dispersion tank, in addition to 0.02% per batch weight of DEE FO® PI40 Defoamer (Munzing). The prepolymer/TEA soluiton was steadily added to the water in the dispersion tank with adequate agitation to disperse. The dispersion was mixed for 10 minutes once prepolymer addition was completed, and then a solution of water with 15% hydrazine was added to the dispersion with strong mixing. The reaction was monitored for completion by checking the isocyanate content using FTIR. When trace isocyanate remained, reaction was cooled and discharged through a 100 µm filter bag.

To test the hydrolytic stability, the cured films were then cut into uniform strips. These strips were then placed into a humidity chamber at 100% relative humidity and 120° F. for 500 hours. Strips were taken out periodically and the tensile strength was measured. The data is represented in Table 3.

Example 16

Preparation of Cast Urethane

Figure 6:
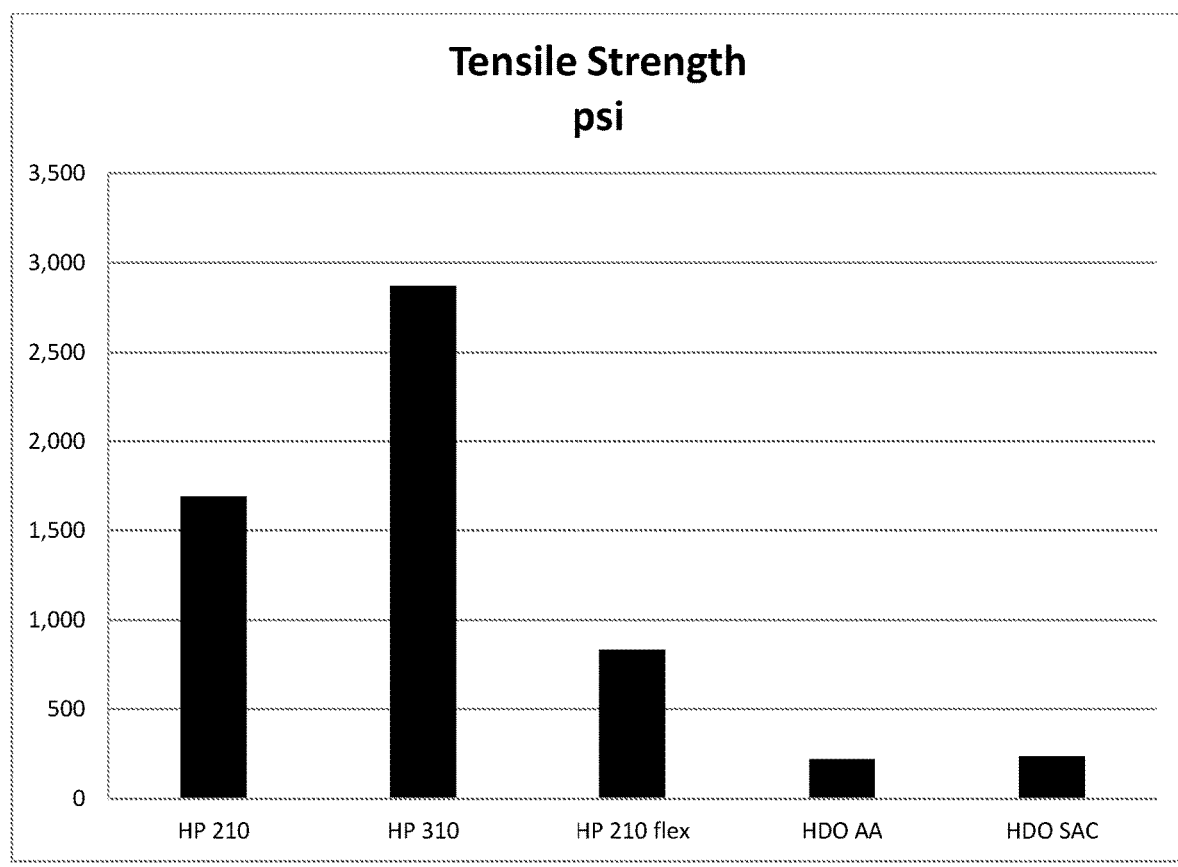
FIG. 6. Comparison of tensile strength of various polyurethanes prepared according to the present invention. Initially various polyester polyols were prepared and then reacted with isocyanate as described in the Example 16 to yield corresponding polyurethanes. The HP 210 polyurethane was derived from HP 210 Polyol described in Example 3. The HP 310 polyurethane was derived from HP 310 Polyol described in Example 4. The HP 210 Flex polyurethane was derived from HP 210 Flex Polyol described in Example 5. The HDO AA polyurethane was derived from a polyester polyol obtained by reacting 1,6-hexanediol with adipic acid as in the Example 9. The HDO SAC polyurethane was derived from a polyester polyol obtained by reacting 1,6-hexanediol with succinic acid as in the Example 8. The tensile strength of various polyurethane prepartions was determined as per the procedure described in ASTM D638.
Figure 7:
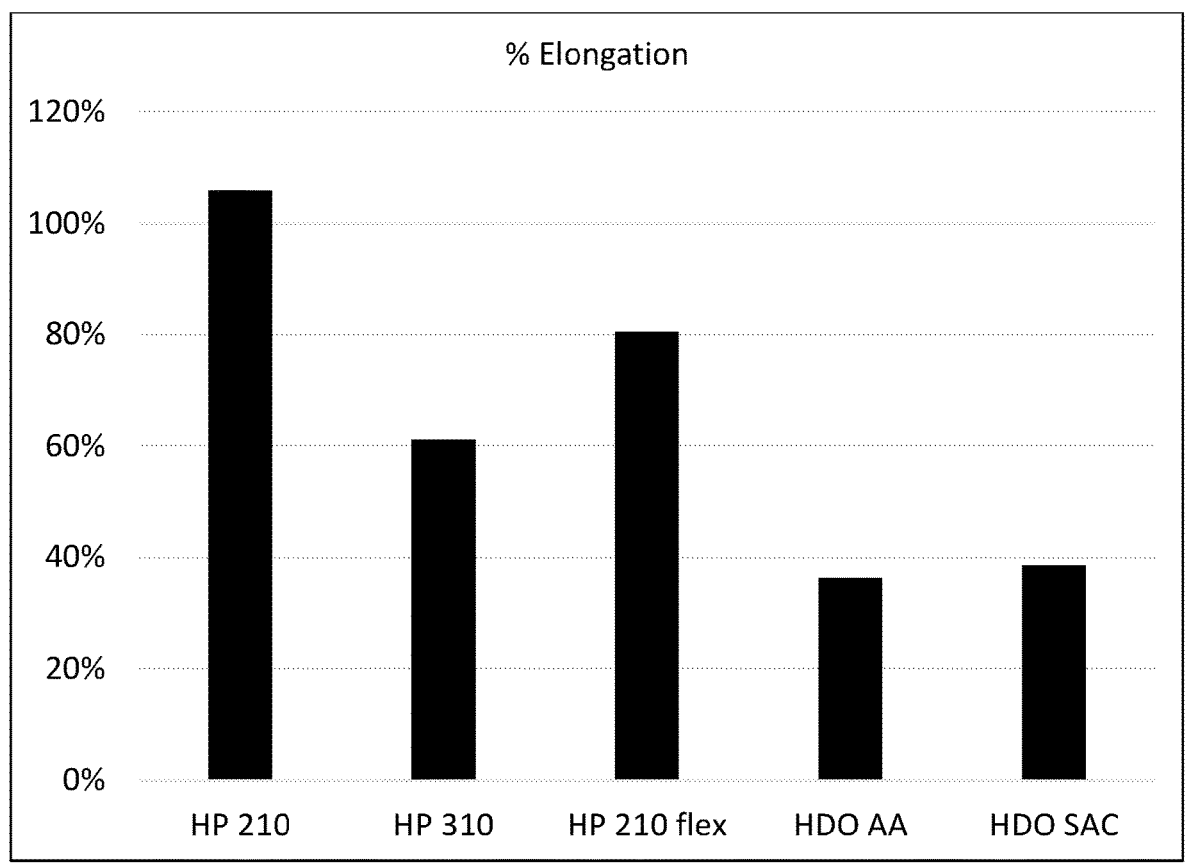
FIG. 7. Comparison of elongation at yield of various polyurethanes prepared according to the present invention. Initially various polyester polyols were prepared and then reacted with isocyanate as described in the Example 16 to yield corresponding polyurethanes. The HP 210 polyurethane was derived from HP 210 Polyol described in Example 3. The HP 310 polyurethane was derived from HP 310 Polyester Polyol described in Example 4. The HP 210 Flex polyurethane was derived from HP 210 Flex Polyol described in Example 5. The HDO AA polyurethane was derived from a polyester polyol obtained by reacting 1,6-hexanediol with adipic acid as in the Example 9. The HDO SAC polyurethane was derived from a polyester polyol obtained by reacting 1,6-hexanediol with succinic acid as in the Example 8. The tensile strength of various polyurethane preparations was determined as per the procedure described in ASTM D638.
Figure 8:
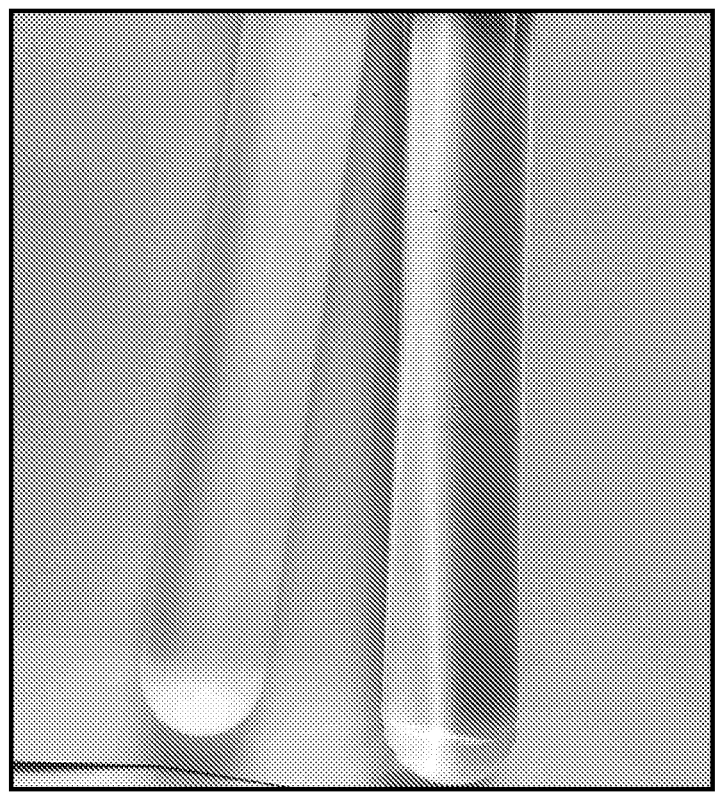
FIG. 8. Comparison of color of urethane acrylate containing bio-derived materials prepared according to the present invention (shown in the left) and a commercially available petroleum derived urethane acrylate (shown in the right). HP 210 polyester polyol prepared according to the procedure described in the Example 3 was treated with isophorone diisocyanate and other reagents according to the procedure described in Example 20 to yield the urethane acrylate containing bio-derived materials.

The HP 210, HP 310, HP 210 Flex, HDO-Adipic acid and HDO-Succinic acid polyester polyols prepared as described in Examples 3, 4, 5, 8, and 9 above were stored under dry conditions. Cast urethanes were then prepared by hand mixing an appropriate amount of a polyester polyol, 100 ppm dibutyltin dilaureate (DBTDL) and isocyanate at an index of 1.05 (NCO/OH equivalent ratio). The mixture was poured into a dog-bone mold and initially cured at 40° C. in an effort to mitigate bubble capture. After initial gelation, the dog-bones were allowed to cure overnight at room temperature and then post cured at 90° C. for four hours. Final mechanical testing was performed at least seven days after initial casting (FIGS. 6 and 7).

Example 17

Preparation of Thermoplastic Polyurethane (TPU)

A TPU was prepared using the one-shot method. Prior to the TPU preparation, HP 56 polyester polyol and 1,4-butanediol were de-moisturized, as needed, by drying under vacuum to <0.05% water. TPUs were prepared at 1.02 isocyanate index (NCO/OH equivalent ratio) targeting 34% hard segment concentration. A Speed Mixer machine was used to mix 39.61 grams HP 56, 3.27 grams 1,4-butanediol, and 17.12 grams Mondur M (MDI from Covestro). The HP 56 and 1,4-butanediol had previously been warmed to 100° C. while the Mondur M was heated to 70° C. The mix time for this TPU was 40 s, the gel time was 86 s, and the press temperature was 120° C. The final TPU was cured at 120° C. for 2 hours, followed by a cure at 100° C. for 20 hours and then followed further by a room temperature cure for 7 days.

The tensile strength, tensile loss at elevated temperatures and elongation loss at elevated temperatures of the TPU prepared according to the procedure described in this example were determined as per the procedure described in ASTM D412. The linear tear strength of the TPU prepared according to the procedure described in this example was determined as per the procedure described in ASTM D6246. The solvent resistance of the TPU prepared according to the procedure described in this example was determined by means of immersing 1 inch strips in the solvent for three days and measuring percent weight gain at the end of three days. The results of these physical and chemical analyses are provided in Tables 4.

Example 18

Preparation of a Two Component Urethane Coating

For this test, casting was performed on steel Taber plates using a 5 Meyer rod. The system comprised of the test polyols, including HP 210, HP 210 Flex, and a control polycarbonate polyol Oxymer HD-112 with HDI trimer at a 1.05 index. The system was catalyzed with DBTDL at 100 ppm and a surfactant was added for flow and levelling. The system was applied in MEK solvent at 70% solids. Curing was allowed at ambient conditions overnight, followed by 4 hours at 80° C. and one week at room temperature. Abrasion testing was performed using a CS-27 wheel with 1000 g weights following the ASTM D4060 Standard Tezt Method Abrasion Resistance. The wheels were conditioned for 50 cycles after every 500 test cycles. The results of abrasion testing are given in Table 5.

Example 19

Polyester Acrylate 1046 grams of HP 210 and 17.4 grams of p-toluenesulfonic acid were added to a reaction flask. An air sparge with a nitrogen blanket was applied to the flask which was equipped with a condenser on the outlet, refluxing into a Dean Stark trap. The temperature was set to 80° C. 1.39 grams of 4-methoxyphenol and 1.39 grams of butylated hydroxytoluene were dissolved into 344 grams of acrylic acid and added to the reaction flask. Approximately 200 mL of heptane were added to the reaction flask as well as into an addition funnel above the Dean Stark trap to allow for addition of heptane as needed. The temperature was increased to a maximum of 102 for the reaction to proceed and condensate water to be collected in the Dean Stark. When water formation slowed, the acid value was monitored. When constant AV was reached, the heptane was distilled off with vacuum. An acid value of 25.2 was measured, and a resulting 94.4 grams of Cardura E10P were added and the temperature was set to 110° C. Once the acid value fell to 8.4 mg/kg OH, the polyester acrylate was cooled and poured.

Example 20

Urethane Acrylate (Myr113-99)

114.5 grams HP 210 polyol prepared in the same fashion as in Example 3 was premixed with 67.2 grams 1,6-hexanediol diacrylate, creating a slight excess of premixed material to account for material hold up when transferring during addition. 96.6 grams of isophorone diisocyanate, 0.13 grams butylated hydroxytoluene (an inhibitor) and 0.05 grams dibutyltin dilaureate catalyst were added to a glass vessel and heated at 70° C. under air followed by the addition of 50.5 grams of 2-hydroxyethyl acrylate, keeping exotherm in control. Once all 2-hydroxyethyl acrylate was added, the reaction was held at 70° C. for 10 minutes followed by the addition of 173 grams of premixed HP 210 and 1, 6-hexanediol diacrylate. The resulting solution was heated up to 90° C. until percentage of isocyanate fell below 0.1%.

In order to test performance of the resulting urethane acrylate, the test oligomer, as well as an epoxy acrylate and a polyester acrylate control were blended to 80% with 1,6-hexanediol diacrylate. To that, 1% TPO photo initiator was added. The resin compositions were then inserted into a Tygon tube and cured under a UV lamp. Finally, the cast "rods" were retrieved by cutting away the tubing and then cross-sectioning the cured resin into smaller rods. These specimens underwent tensile analysis using an Instron.

TABLE 1

Chemical properties of various polyurethane dispersions prepared as in the Examples 10, 11 and 12

| Polyester polyol component | pH | Total Solids, % | Viscosity, cps |
|---|---|---|---|
| HDO/AA/Isophthalic acid | 8.7 | 36.9 | 450 |
| HDO/SAC/Isophthalic acid | 9.0 | 38.4 | 917 |
| HP 210 | 8.0 | 37.5 | 33 |

TABLE 2

Physical properties of various polyurethane dispersions Prepared as in Examples 10, 11 and 12

| Polyester polyol component | Pendulum Hardness (Seconds) | Cross Hatch Adhesion | Shore Hardness A | Shore Hardness D |
|---|---|---|---|---|
| HDO/AA/Isophthalic acid | 106 | 4 | 74 | 33 |
| HDO/SAC/Isopthalic acid | 111 | 4 | 59 | 28 |
| HP 210 | 206 | 3 | 82 | 60 |

TABLE 3

Tensile strength loss of polyurethane dispersions after humid aging (Examples 13-15)

| Sample | Initial (psi) | 72 hours (psi) | 168 hours (psi) | 378 Hours (psi) | 500 hours (psi) |
|---|---|---|---|---|---|
| HP 110 Flex | 4210 | 3760 | 3830 | 3250 | 3120 |
| Piothane ® 67-1000 HDO adipate | 4880 | 4300 | 4170 | n/a* | n/a* |
| Oxymer HD 56/Oxymer HD 112 Polycarbonate | 3550 | 3310 | 3400 | 3240 | 3350 |

*PUD film completely destroyed

TABLE 4

Physical and chemical properties of the thermoplastic urethane preparation as in Example 17

| Tensile strength | 8366 psi |
|---|---|
| Tensile strength at 50° C. | 3814 psi |
| Elongation at 50° C. | 375% |
| Tensile strength at 70° C. | 2732 psi |
| Elongation at 70° C. | 528% |
| Linear tear strength | 4316 psi |
| Solvent absorption, ethyl acetate | 28.8% |
| Solvent absorption, toluene | 1.10% |
| Solvent absorption, Oil | 0.40% |

TABLE 5

Abrasion test result (Example 18)

| Nature of Polyol | Total Loss, 1000 cycles |
|---|---|
| Polycarbonate (Oxymer HD-112) | 2.6 mg |
| HP 210 | 9.4 mg |
| HP 210 Flex | 0.0 mg* |

*HP 210 Flex still did not show any weight loss for over 5000 cycles.

What is claimed:

1. A two component polyurethane system, comprising:
an isocyanate component; and
a polyol component comprising a polyester polyol containing at least 50% biorenewable content;
wherein the polyester polyol comprises, in reacted form, biorenewable succinic acid, biorenewable 1,3-propanediol, biorenewable isosorbide, and an optional dimer or trimer acid;
wherein the polyester polyol is prepared by a process comprising an initial reaction where the biorenewable succinic acid reacts with the secondary hydroxyl groups of the biorenewable isosorbide, and
wherein a majority of the hydroxyl groups of the polyester polyol are primary hydroxyl groups.

2. The system of claim 1, wherein the polyester polyol comprises, in reacted form, biorenewable succinic acid, biorenewable 1,3-propanediol, biorenewable isosorbide, and a dimer acid.

3. The system of claim 2, wherein a polyurethane material made from the two component polyurethane system has an abrasion resistance with no measurable weight loss in an abrasion test for over 1000 cycles.

4. The system of claim 1, wherein the polyester polyol comprises, in reacted form, biorenewable succinic acid, biorenewable 1,3-propanediol, biorenewable isosorbide, and a trimer acid.

5. The system of claim 1, wherein the isocyanate component comprises an aliphatic isocyanate.

6. The system of claim 1, wherein the isocyanate component comprises an aromatic isocyanate.

7. The system of claim 1, wherein a polyurethane material made from the two component polyurethane system has a tensile strength of at least 1000 psi.

8. The system of claim 1, wherein the polyester polyol has a hydroxyl value ranging from about 25 to about 330.

9. An aqueous polyurethane dispersion comprising a polyurethane formed by reacting the system of claim 1.

10. The dispersion of claim 9, wherein the polyester polyol comprises, in reacted form, biorenewable succinic acid, biorenewable 1,3-propanediol, biorenewable isosorbide, and a dimer acid.

11. The dispersion of claim 9, wherein the polyester polyol comprises, in reacted form, biorenewable succinic acid, biorenewable 1,3-propanediol, biorenewable isosorbide, and a trimer acid.

12. The dispersion of claim 9, wherein the polyurethane has a pendulum hardness of at least 200 seconds.

13. The dispersion of claim 9, wherein the polyurethane has a tensile strength loss of no more than 50% after 500 hours in a humidity chamber with 100% relative humidity and temperature of 120° F.

14. A thermoplastic polyurethane formed by reacting the system of claim 1.

15. The polyurethane of claim 14, having a tear strength of at least 2000 psi.

16. The polyurethane of claim 14, having ethyl acetate absorption of no more than 40%.

17. The polyurethane of claim 14, having toluene absorption of no more than 10%.

18. The polyurethane of claim 14, wherein the isocyanate component comprises an aliphatic isocyanate.

19. The polyurethane of claim 14, wherein the isocyanate component comprises an aromatic isocyanate.

20. The polyurethane of claim 14, wherein the polyurethane has a tensile strength of at least 1000 psi.

* * * * *